Sept. 17, 1935.  C. T. ACHOR  2,014,364
FLY SWATTER
Filed Sept. 11, 1933
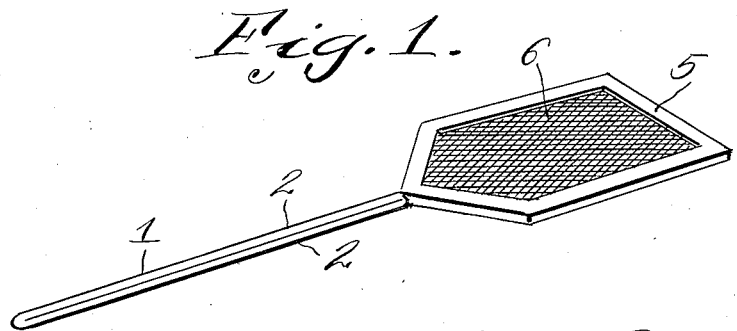
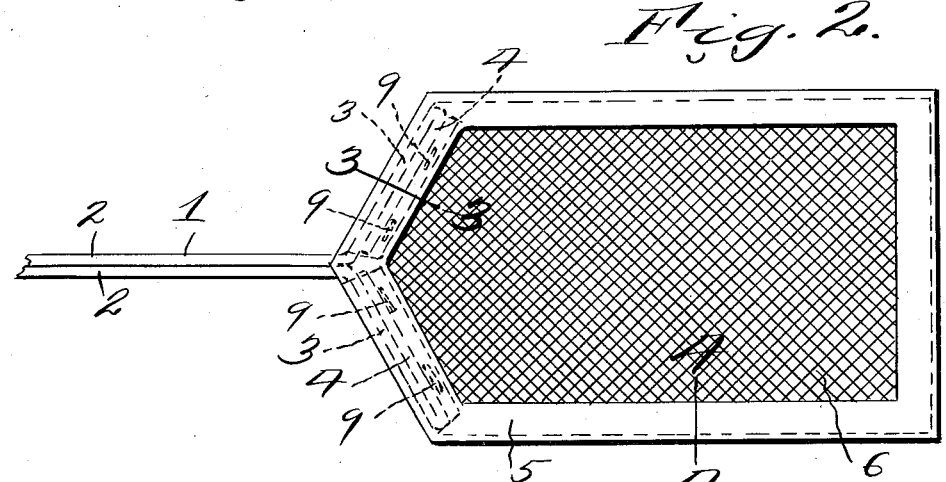
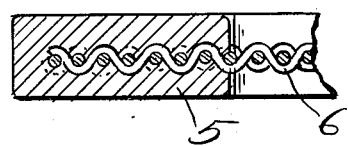
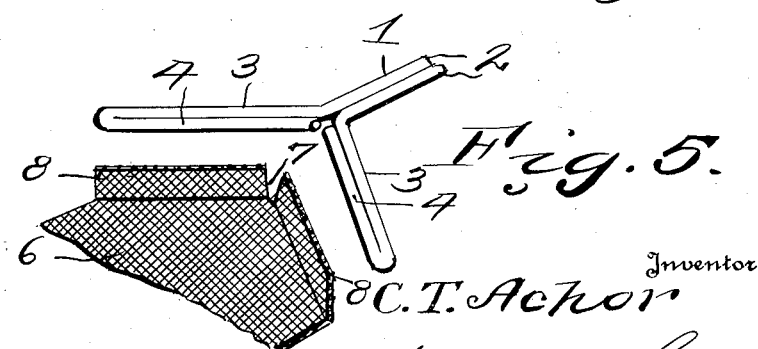

Patented Sept. 17, 1935

2,014,364

UNITED STATES PATENT OFFICE 2,014,364

FLY SWATTER

Charles T. Achor, Warsaw, Ind.

Application September 11, 1933, Serial No. 689,041

1 Claim. (Cl. 43—137)

The invention relates to fly swatters, and has for its object to provide a device of this character wherein the wire mesh body has a rubber marginal binding, said binding being vulcanized thereon so that the rubber will extend through the mesh work, thereby not only providing a protective binding, but at the same time increasing the stiffness of the mesh body as a whole during the fly swatting operation.

A further object is to form the handle with diverging arms, around which the inner end of the wire mesh extends and is riveted, and to imbed said arms and wire mesh in the rubber binding.

A further object is to form the handle from wire, bent upon itself to form the handle member, each wire, forming the handle member, terminating in arms in diverging relation, and formed by bending the wire onto itself.

A further object is to provide the inner end of the wire mesh with flanges bent over the diverging arms at opposite sides of the handle, and riveted together.

With the above and other objects in view the invention resides in the combination and arrangement of parts as hereinafter set forth, shown in the drawing, described and claimed, it being understood that changes in the precise embodiment of the invention may be made within the scope of what is claimed, without departing from the spirit of the invention.

In the drawing:

Figure 1 is a perspective view of the swatter.

Figure 2 is a top plan view of the swatter.

Figure 3 is a transverse sectional view through one of the handle arms and the rubber binding.

Figure 4 is a transverse sectional view through one side of the swatter, taken on line 4—4 of Figure 2.

Figure 5 is a perspective view of one end of the handle member and a portion of the wire mesh, showing the same in position to be assembled.

Referring to the drawing, the numeral 1 designates the handle adapted to be grasped by the operator during a swatting operation, and which handle is preferably formed from a single piece of wire, bent upon itself to form arms 2. The arms 2 terminate in diverging arms 3 having portions 4 bent upon them in the plane of the handle 1, and adapted to be imbedded in the rubber binding 5 on the marginal edge of the wire mesh body 6. Arms 3 are not only braced by the members 4, but in connection with the members form an off-round portion for imbedding in the binding whereby the binding will not pivot thereon, particularly when the binding is placed on the wire mesh by vulcanizing or moulding.

By vulcanizing the binding 5 on the wire mesh, it will be noted, by referring to Figure 3, that the rubber will extend through the mesh work and into axial engagement and cohesive engagement with the arms 3 and 4, thereby additionally preventing any pivotal movement on the arms, and at the same time by this cohesive engagement of the rubber binding in the mesh wires, the flexibility of the main body of the swatter is stiffened to prevent bending of the swatter as is now the common difficulty with fly swatters wherein fabric or rubber strips are sewed or otherwise secured around the swatter. The inner end of the wire mesh material is split as at 7 for the reception of the handle 1 adjacent the diverging arms 3, and after the arms 3 are in position behind the flanges 8 formed by the split 7, said flanges 8 are bent over the arms 3 and 4, and are secured to the main body 6 by means of staples 9, therefore it will be seen that the wire mesh is permanently anchored on the diverging arms 3 and 4 before the vulcanizing operation of the binding, consequently this additional material is imbedded in the rubber.

From the above it will be seen that a fly swatter is provided wherein the handle and the diverging arms are formed from a single piece of wire bent to form, and the diverging arms and marginal edges of the wire mesh material are imbedded in the rubber binder in a manner whereby the rubber extends through the wire mesh work.

The invention having been set forth what is claimed as new and useful is:

A fly swatter comprising a handle member, diverging arms carried by said handle member, said diverging arms having portions bent upon them for substantially their entire length thereby stiffening the diverging arms and forming an off-round structure, a wire mesh member, one end of said wire mesh member being folded over said diverging arms and the portions bent thereon, securing means extending through said folded portion of the wire mesh member to the inner sides of the diverging arms and the portions bent thereon and a rubber binding vulcanized through the wire mesh members and embedding the diverging arms and portions bent thereon therein, thereby forming a substantially rigid structure for the full width of the wire mesh member adjacent the handle member.

CHARLES T. ACHOR.